(12) United States Patent
Combes et al.

(10) Patent No.: US 7,124,162 B2
(45) Date of Patent: Oct. 17, 2006

(54) ADDER TREE STRUCTURE DIGITAL SIGNAL PROCESSOR SYSTEM AND METHOD

(75) Inventors: Alain Combes, Toulouse (FR); Franz Steininger, Gilbert, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 687 days.

(21) Appl. No.: 10/282,523

(22) Filed: Oct. 29, 2002

(65) Prior Publication Data

US 2003/0093454 A1    May 15, 2003

(51) Int. Cl.
*G06F 7/52* (2006.01)
(52) U.S. Cl. .................................... 708/629
(58) Field of Classification Search ............... 708/708, 708/629
See application file for complete search history.

(56) References Cited

U.S. PATENT DOCUMENTS

| | | | | |
|---|---|---|---|---|
| 4,839,848 A | * | 6/1989 | Peterson et al. ............ 708/625 |
| 4,868,778 A | * | 9/1989 | Disbrow ..................... 708/625 |
| 5,798,956 A | * | 8/1998 | Park ........................... 708/626 |
| 5,978,827 A | * | 11/1999 | Ichikawa .................... 708/709 |
| 2004/0117424 A1 | * | 6/2004 | Larsson et al. ............. 708/708 |
| 2004/0143619 A1 | * | 7/2004 | Grinchuk .................... 708/706 |

* cited by examiner

*Primary Examiner*—Tan V. Mai

(57) ABSTRACT

A Wallace tree structure such as that used in a digital signal processor (DSP) is arranged to sum vectors. The structure has a number of adder stages, each of which may have half adders with two input nodes, and full adders with three input nodes. The structure is designed with reference to the vectors to be summed. The number of full- and half-adders in each stage and the arrangement of vector inputs depends upon their characteristics. An algorithm calculates the possible tree structures and input arrangements, and selects an optimum design having a small final stage ripple adder after the last stage of the Wallace tree structure, the design being based upon the characteristics of the vector inputs. This leads to reduced propagation delay and a reduced amount of semiconductor material for implementation of the DSP.

6 Claims, 3 Drawing Sheets

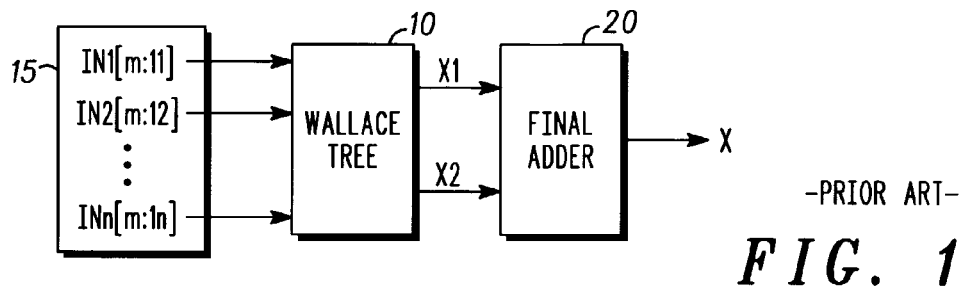
FIG. 1 —PRIOR ART—
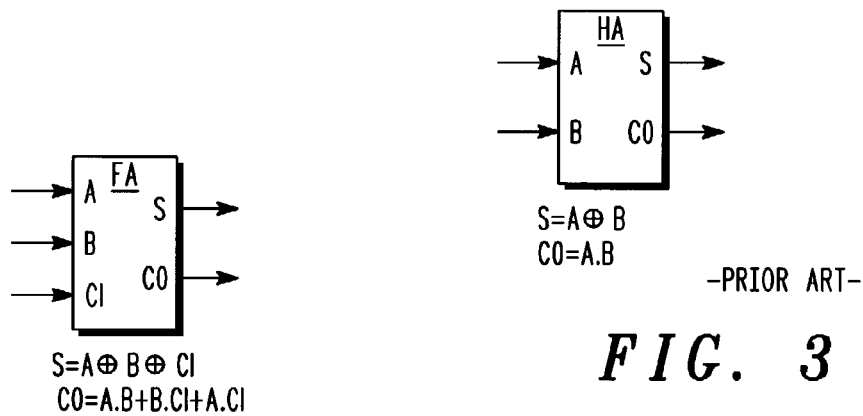
FIG. 3 —PRIOR ART—
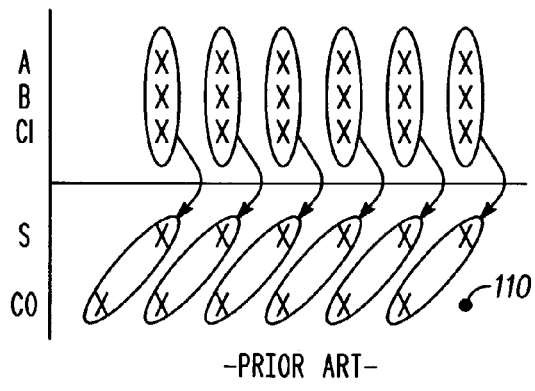
FIG. 2 —PRIOR ART—
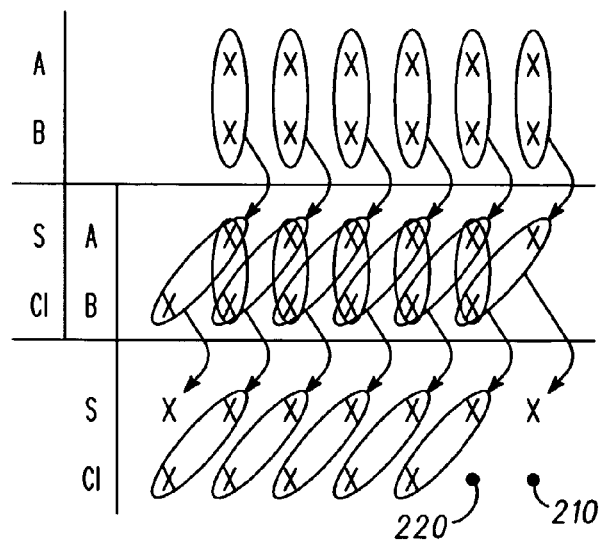
FIG. 4 —PRIOR ART—
FIG. 5

ADDER TREE STRUCTURE DIGITAL SIGNAL PROCESSOR SYSTEM AND METHOD

FIELD OF THE INVENTION

This invention relates to adder tree structures commonly used in electronic hardware to sum vectors, and particularly but not exclusively to such structures when used in a multiplier to sum partial products produced in a multiplication process.

BACKGROUND OF THE INVENTION

In the field of this invention a Wallace tree is a well known implementation of an adder tree designed to sum vectors with a minimum propagation delay. Rather than completely adding the partial products in pairs as known in a ripple adder tree, a Wallace tree sums up all the bits of the same weights in a merged tree. Typically, full adders are used in Carry-Save-Add (CSA) units, so that 3 equally weighted bits are combined to produce two bits: one bit being the carry, and the other bit being the sum. Each layer of the tree therefore reduces the number of vectors by a factor of 3:2. The tree has as many layers as is necessary to reduce the number of vectors to two of each weight (a carry and a sum). A conventional ripple adder is then used to combine these to obtain the final product. The delay of such a Wallace tree is proportional to log 10(n), where n is the number of partial products combined. The structure of such an arrangement is shown in FIG. 1, where vector inputs 15 are fed to a Wallace tree 10. Two partial vector outputs X1 and X2 of the Wallace tree 10 are then fed to a final stage ripple adder 20, which produces a single output vector X.

A problem with existing Wallace tree designs is the area of semiconductor material necessary for their implementation.

From U.S. Pat. No. 4,839,848 there is known a fast multiplier circuit incorporating parallel arrays of 2-bit and 3-bit adders.

However, this approach has the disadvantage that the summations required in a multiplier in typical applications such as digital signal processors (DSPs) are timing critical, and are often the cause of shortfall in DSP performance. Indeed the multiplier is often the critical path in DSP architecture and the maximum achievable frequency for the multiplier gives the maximum frequency of the DSP.

Therefore a trade-off exists between the semiconductor area required, and performance. A need therefore exists for an adder tree structure, DSP, and method wherein the abovementioned disadvantages may be alleviated.

STATEMENT OF INVENTION

In accordance with a first aspect of the present invention there is provided an adder tree structure as claimed in claim 1.

In accordance with a second aspect of the present invention there is provided a Digital Signal Processor as claimed in claim 2.

In accordance with a third aspect of the present invention there is provided a method as claimed in claim 5.

In accordance with a fourth aspect of the present invention there is provided a system as claimed in claim 9.

Preferably the adder tree structure further comprises a final stage ripple adder, the plurality of adder stages being arranged in a predetermined one of a number of possible configurations, each configuration having an associated final stage ripple adder size, wherein the predetermined configuration is chosen such that the adder tree structure has the smallest final stage ripple adder size of all of the possible configurations.

Preferably the adder tree structure comprises a plurality of adder stages, each adder stage having a plurality of adders, the vector tree position combinations relating to the arrangements of the plurality of adders and the plurality of adder stages.

The plurality of adder stages preferably include at least one adder stage having an adder arrangement comprising first and second half-adder series, each half-adder series having vector inputs and vector outputs; the vector outputs of the first half-adder series being coupled to the vector inputs of the second half-adder series such that the first and second half-adders are in cascaded arrangement within the at least one adder stage.

Preferably the calculated propagation characteristics refer to the required bit-depth of a final stage adder coupled to the tree structure, the selected vector tree position combination and instantiation being those which lead to a final adder having the smallest bit-depth.

In this way an adder tree structure, DSP, system and method are provided which exhibit decreased propagation delay and hence facilitate faster DSP performance while using a reduced amount of semiconductor material for implementation.

BRIEF DESCRIPTION OF THE DRAWINGS

One adder tree structure, DSP, system and method incorporating the present invention will now be described, by way of example only, with reference to the accompanying drawings, in which:

FIG. 1 shows a block schematic representation of a prior art vector adder, incorporating a Wallace tree;

FIG. 2 shows a block schematic representation of a Full Adder;

FIG. 3 shows a block schematic representation of a Half Adder;

FIG. 4 shows a diagram showing Full Adder operation in a Wallace tree;

FIG. 5 shows a diagram showing operation of a double stage Half Adder in a Wallace tree in accordance with the present invention;

DESCRIPTION OF PREFERRED EMBODIMENT

Figure 6:
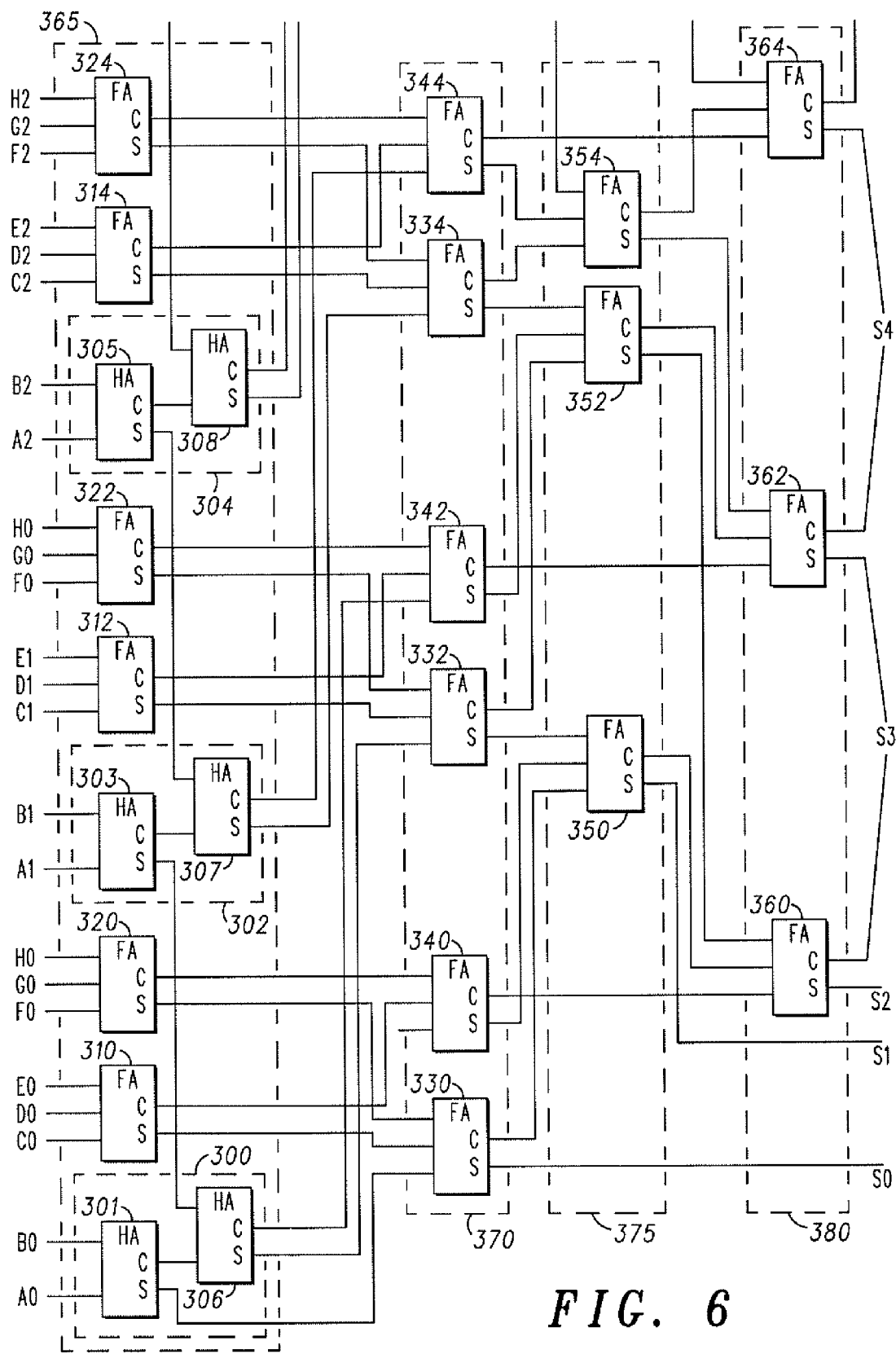
FIG. 6 shows an illustrative block diagram of a Wallace tree in accordance with the present invention.

Referring firstly to FIG. 1, a known vector adder is shown, using a Wallace tree 10 to sum up n number of IN vectors 15 (IN1[m:11] to INn[m:ln]), where m is the number of bits per vector and 1 is the lowest vector index (the least significant bit of the vector) having a non-zero value in each case.

The Wallace tree 10 comprises a number of stages, each stage composed of Carry-Save Full-or Half-Adders (FA or HA). A FA is shown in FIG. 2, and a HA is shown in FIG. 3. The FA takes three vectors A, B and CI (carry-in), and provides outputs S (Sum) and CO (carry-out). These are calculated as follows:

$$S = A \oplus B \oplus CI$$

$$CO = A.B + B.CI + A.CI$$

The HA takes two vectors A and B, and provides outputs S (Sum) and CO (carry-out). These are calculated as follows:

$$S = A \oplus B$$

$$CO = A.B$$

The Wallace tree structure reduces the summation process into intermediate stages. In a simple arrangement using only FAs, the ratio of input to output vectors will be 3:2 for each stage, leading to a reduction in the number of vectors per stage by ⅔. Also for each stage, the input vectors are grouped into sets of 3 (for each FA in the stage), and the remaining lines are passed to the next stage (in the case of the penultimate stage (from 4 to 3) one input is by-passed to the final stage.

The Wallace tree 10 provides two vector outputs X1 and X2. These are fed to a final stage ripple adder 20, which combines X1 and X2 to provide a single vector result X.

The final stage ripple adder is a Carry-LookAhead stage (CLA) with carry propagation.

Taking as an example a 14 input Wallace tree, it will be understood that the vector addition is done in 6 stages, carries being propagated from one stage to the other with FAs:
- (i) 14/10 (four FAs with two carried vectors)
- (ii) 10/7 (three FAs with one carried vector)
- (iii) 7/5 (two FAs with one carried vector)
- (iv) 5/4 (one FA with two carried vectors)
- (v) 4/3 (one FA with one carried vector)
- (vi) 3/2 (one FA with no carried vectors)

It is possible to use one or more HA subgroups when the number, modulo 3, of inputs in a stage is not equal to 0. HA subgroups have two input nodes and two output nodes, and FAs have three input nodes and two output nodes.

The present invention groups input lines on each stage as follows (where K is the number of inputs for a given stage):
- if K modulo 3 equals 0 (in other words if K=3, 6, 9 etc . . . ), all inputs are grouped by means of FAs (each having 3 inputs);
- if K modulo 3 equals 1 (in other words if K=1, 4, 7 etc . . . ), 2 sets of HAs may be used (e.g., for K=10, the implementation might be two FAs and two HAs);
- if K modulo 3 equals 2 (in other words if K=2, 5, 8 etc . . . ), 1 set of HAs may be used (e.g., for K=8, the implementation might be two FAs and one HA).

So considering the above example of a 14 input Wallace tree, the vector addition may now be achieved as follows:
- (i) 14/10 (four FAs and one HA)
- (ii) 10/8 (two FAs and two HAs)
- (iii) 8/6 (two FAs and one HA)
- (iv) 6/4 (two FAs)
- (v) 4/3 (one FA with one carried vector)
- (vi) 3/2 (one FA)

Referring first to FIG. 4, there is shown a block representation of the addition of three vectors, A, B and C1 by a FA. Signals coming from the same column (or vector degree) are summed, resulting in a sum in the same column and a carry in the following one, as shown in FIG. 4.

In this way the meaningful bits of carry output vector CO are shifted one place to the left (illustrated by the bullet 110). The Least Significant Bit (LSB) of this vector is therefore a null bit, and can be ignored in further calculations involving the carry output vector Co.

Referring now also to FIG. 5, a double-stage HA structure is shown in which a HA stage is provided using two HAs in a cascaded configuration. This facilitates the 'saving' of 2 bits instead of 1 (bullets 210 and 220). This double HA structure has a propagation delay roughly equal to one FA (since HAs are much faster than FAs), and therefore does not introduce a timing problem.

The invention takes advantage of this HA improved structure which gives a gain of two bit shifts to the left, compared to a FA group (one bit shift) and uses it whenever appropriate. For example, a 10 input stage would not be split in 3 groups of FA and one input bypassing the stage, but by 2 groups of FA and 2 groups of HA. Similarly, when implemented in a DSP multiplier for all-digital filtering, with a 27 input vector adder, 5 bits may be saved in the Final Adder.

The advantage gained by the above arrangement is dependent on the position of the least significant non-zero bit of each vector. As the vectors propagate through the Wallace tree, the position of the least significant non-zero bits are shifted to the left by varying degrees. Maximum propagation benefit is obtained if vectors that have the same bit-shift are combined. If this is not the case, the advantage of the saved bit is lost, as it cannot be propagated through to the next stage. Therefore the vectors need to be combined in such a way that vectors with 'saved bits' are not combined with vectors without.

If expressed mathematically, the vector X2 (as shown in FIG. 1) can be written in the following form:

$$(X2[m], X2[m-1], \ldots, X2[s], 0, \ldots, 0)$$

where s>0, s being the least significant non-zero bit.

The final m-bit addition becomes a faster (m-s)-bit addition with the s least significant bits directly output from X1 to the final adder output.

Moreover this simplification saves some propagate-generate stages, resulting in a saving of semiconductor area also.

Referring now also to FIG. 6 there is shown an exemplary Wallace tree structure, designed in accordance with the invention. The Wallace tree structure has a first adder stage 365, a second adder stage 370, a third adder stage 375 and a last stage 380. A ripple adder (not shown in FIG. 6), equivalent to the final adder 20 of FIG. 1 is connected after the last stage 380 of the Wallace tree structure to receive the outputs S0 to S4 from the Wallace tree structure.

The first adder stage 365 has two series of FAs (310, 312, 322 being a first series and 320, 322, 324 being a second series) and a series of double-stage HAs 300, 302, 304 as described above with reference to FIG. 4.

The double-stage HA 300 has a first HA 301 coupled to receive vector inputs to be further described below for providing a sum output s301 and a carry output c301, and a second HA 306 having a first input coupled to receive c301 from the first HA 301, and a second input to be further described below. The second HA 306 provides a sum output s306 and a carry output c306.

Similarly the double-stage HA 302 has a first HA 303 which provides a sum output s303 and a carry output c303, and a second HA 307 which provides a sum output s307 and a carry output c307. The same applies for the double-stage HA 304, having HAs 305 and 308, with outputs s305, c305, s308, c308 respectively.

Vector inputs A–H are fed into the first adder stage 365. The vector inputs are as follows:
XXXXXX (1) H
XXXXXX (2) G

XXXXXX (3) F
XXXXXX (4) E
XXXXXX (5) D
XXXXXX (6) C
XXXXXX (7) B
XXXXXX (8) A

In FIG. 6, only three bits are shown for each vector (A0, A1, A2, etc . . . ) although it will be appreciated that the portion of the Wallace tree not shown in FIG. 6 is substantially similar to that shown. The ripple adder 380 is a 2 vector adder and is utilised at the 3rd polynomial degree.

In the first stage, the vectors are combined thus:

A+B (with HA stages 300, 302, 304)
C+D+E (with FA stages 310, 312, 314)
F+G+H (with FA stages 320, 322, 324)

The first HA 301 of the double-stage HA 300 is coupled to receive A0 and B0, and provides s301 and c301. The second HA 306 of the double-stage HA 300 is coupled to receive c301 from the first HA 301, and also s303, which is the sum output from the first HA 303 of the double-stage HA 302 (representing the carry output of A1 summed with B1).

Considering only the bits A0-H0, the partial results from the HA 301 are:

XXXXXX output s301, sum of A0+B0
XXXXX- output c301, carry of A0+B0 (single shift -)

Output c301 is then fed into the second HA 306, which leads to the results:

XXXXX- output s306, sum of c301+s303 (single shift -)
XXXX-- output c306, carry of c301+s303 (double shift --)

The outputs of the two series of FAs are as follows (again only referring to bits A0–H0):

XXXXXX output s of 310, sum of C0+D0+E0
XXXXX- output c of 310, carry of C0+D0+E0 (shift -)
XXXXXX output s of 320, sum of F0+G0+H0
XXXXX- output c of 320, carry of F0+G0+H0 (shift -)

It will be understood that the above vector results are truncated, only the rightmost(least significant) bits are shown.

At the second stage:

XXXXXX output s of 330, sum of (s301)+(s310)+(s320)
XXXXX- output c of 330, carry of (s301)+(s310)+(s320)
XXXXX- output s of 340, sum of (null)+(c310)+(c320)
XXXX-- output c of 340, carry of (null)+(c310)+(c320)

At this point, it can be seen that the rightmost X on the output of s of 330 has no equivalent (same degree) on any of the other lines. Therefore this bit bypasses the next stage.

At the third stage:

XXXXXX output s of 350, sum of (s332+s340+c330)
XXXX-- output c of 350, carry of (s332+s340+c330)
XXXX-- bypass line, output c of 340

Therefore, at the last stage:

XXXXXX output s of 360, sum of (c340+c350+s352)
XXX--- output c of 360, carry of (c340+c350+s352)

In this way two bits were bypassed, and the HA stages start at degree 3. For the final stage of adders therefore, 3 bits are already resolved.

Figure 7:
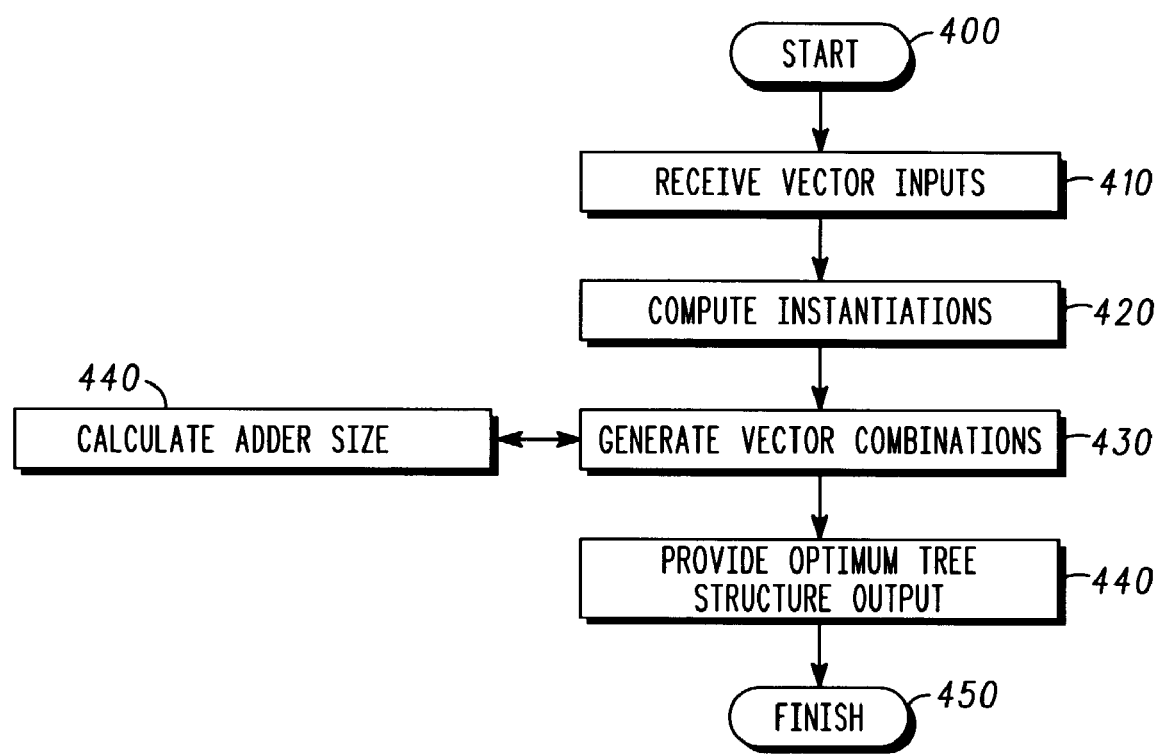
FIG. 7 shows a flow diagram illustrating the design process of a Wallace tree in accordance with the present invention.

Referring now also to FIG. 7, in order to arrive at the optimum structure for a Wallace tree using the mixed HA and FA arrangement described above, an algorithm is provided. This takes as its input (box 410) the number of input vectors and their respective least significant non-zero bits. All possible FA and HA instantiations of the tree structure are then computed (box 420).

The algorithm looks at the least significant non-zero bits of each vector, and maps the vectors on to each instantiation in different position combinations. All possible combinations of vector groupings for all possible instantiations are generated (box 430), and the algorithm calculates the required final adder size for each one (box 440). The combination with the smallest final adder size (that with the highest number of 'saved' bits as illustrated by the bullets in FIGS. 3 and 4) is then selected as the optimum tree structure, and provided as an output (box 450). In other words the algorithm selects the instantiation and grouping combination of vectors which result in a final stage adder in which the number of saved bits is maximised (and the ripple adder depth is minimised).

It will be understood that the present invention provides a new scheme of grouping input lines on each stage, and introduces a new double-stage structure using a cascaded two-element Half Adder (as illustrated in FIG. 5).

In this way the present invention improves the overall propagation time in a Wallace tree by reducing the size of the final adder without adding delay to the Wallace tree. This also leads to a reduction in the area of semiconductor material required for the implementation of the Wallace tree structure in an integrated circuit multiplier or DSP, so reducing cost and size.

It will be appreciated that the method described above for designing an adder tree structure for summing a number of vectors may be carried out in software running on a processor (not shown), and that the software may be provided as a computer program element carried on any suitable data carrier (also not shown) such as a magnetic or optical computer disc.

It will be appreciated that alternate embodiments to that described above are possible. For example, the precise methodology and arrangement of the algorithm may differ from that described above. For example rather than computing all possible instantiations first, each instantiation of a Wallace tree may be overlaid with all possible vector combinations, before the next possible instantiation is computed.

Furthermore it will be appreciated that the above Wallace tree structures are examples only, and the scope of the invention is not limited to these examples.

The invention claimed is:

1. An adder tree structure comprising a plurality of adder stages in a Wallace Tree structure, each of said plurality of adder stages being arranged to sum a plurality of vector inputs (A–H) to provide partial vector products, at least one of said adder stages including in a single adder stage an adder arrangement comprising first and second half-adder series as well as at least one full adder stage, each of said half-adder series having vector inputs and vector outputs; said vector outputs of said first half-adder series being coupled to said vector inputs of said second half-adder series such that said first and second half-adders are in cascaded arrangement within said single adder.

2. A Digital Signal Processor incorporating the adder tree structure of claim 1.

3. An adder tree structure as claimed in claim 1 further comprising a final stage ripple adder, said plurality of adder stages being arranged in a predetermined one of a number of possible configurations, each configuration having an associated final stage ripple adder size, wherein said predetermined configuration is chosen such that said adder tree structure has the smallest final stage ripple adder size of all of said number of possible configurations.

4. A Digital Signal Processor incorporating the adder tree structure of claim 3.

5. An adder tree structure as claimed in claim 1, wherein said single adder stage has K input lines, where K modulo 3 equals 1 and said single adder stage comprises two sets of said half-adder series.

6. An adder tree structure as claimed in claim 1, wherein said single adder stage has K input lines, where K modulo 3 equals 2 and said single adder stage comprises one set of said half-adder series.

* * * * *